United States Patent [19]
> Goff et al.

[11] 3,834,278
[45] Sept. 10, 1974

[54] POWER STEERING SYSTEM WITH AUXILIARY POWER CAPABILITY

[75] Inventors: Raymon L. Goff; Jim L. Rau, both of Lafayette, Ind.

[73] Assignee: TRW Inc., Cleveland, Ohio

[22] Filed: Dec. 15, 1972

[21] Appl. No.: 315,502

[52] U.S. Cl. ............................. 91/413, 180/79.2 R
[51] Int. Cl. .......................................... F15b 11/00
[58] Field of Search ..................... 91/414, 411, 413; 180/79.2 R; 60/384

[56] References Cited
UNITED STATES PATENTS

| | | | |
|---|---|---|---|
| 3,452,543 | 7/1969 | Goff et al. | 60/384 |
| 3,481,147 | 12/1969 | Goff | 60/384 |
| 3,713,296 | 1/1973 | Black | 91/414 |

*Primary Examiner*—Edgar W. Geoghegan
*Assistant Examiner*—William F. Woods
*Attorney, Agent, or Firm*—Hill, Gross, Simpson, Van Santen, Steadman, Chiara & Simpson

[57] ABSTRACT

A vehicular power steering system including a primary hydraulic circuit for operating the steered wheels and a secondary hydraulic circuit for operating auxiliary equipment such as an implement or the like which may be attached to the vehicle. The system includes a fluid controller for controlling the flow of pressurized fluid from a power pump to the primary or steering circuit and the implement or secondary circuit. The fluid controller includes a valve mechanism which is constructed and arranged to provide the primary hydraulic circuit with pressurized fluid in the amount necessary to produce the desired steering maneuver while furnishing the secondary hydraulic circuit with the excess pressurized fluid supplied by the power pump. Thus the requirements of the primary hydraulic circuit may be always satisfied and have priority over the requirements of the secondary circuit in all modes of operation.

5 Claims, 3 Drawing Figures

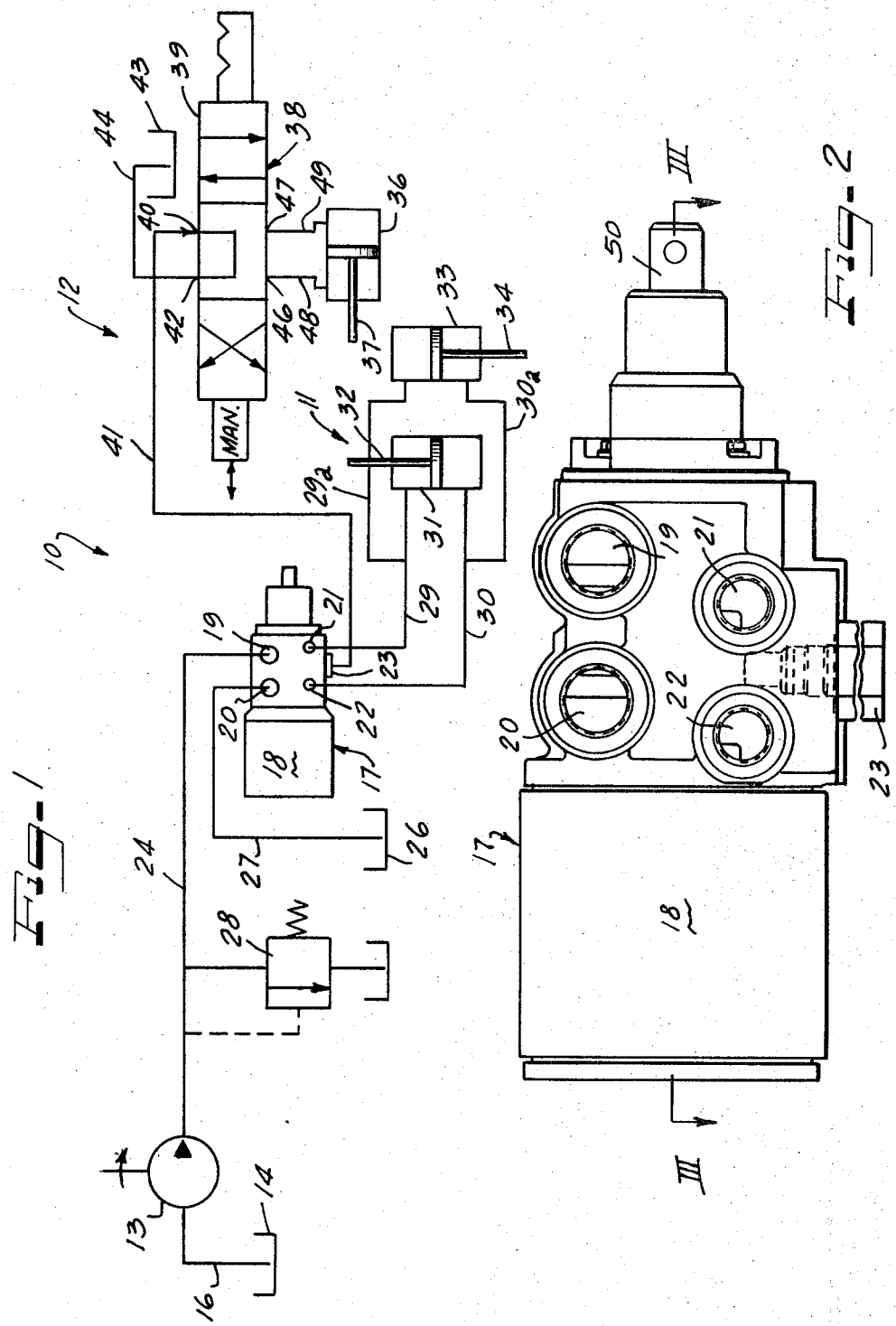

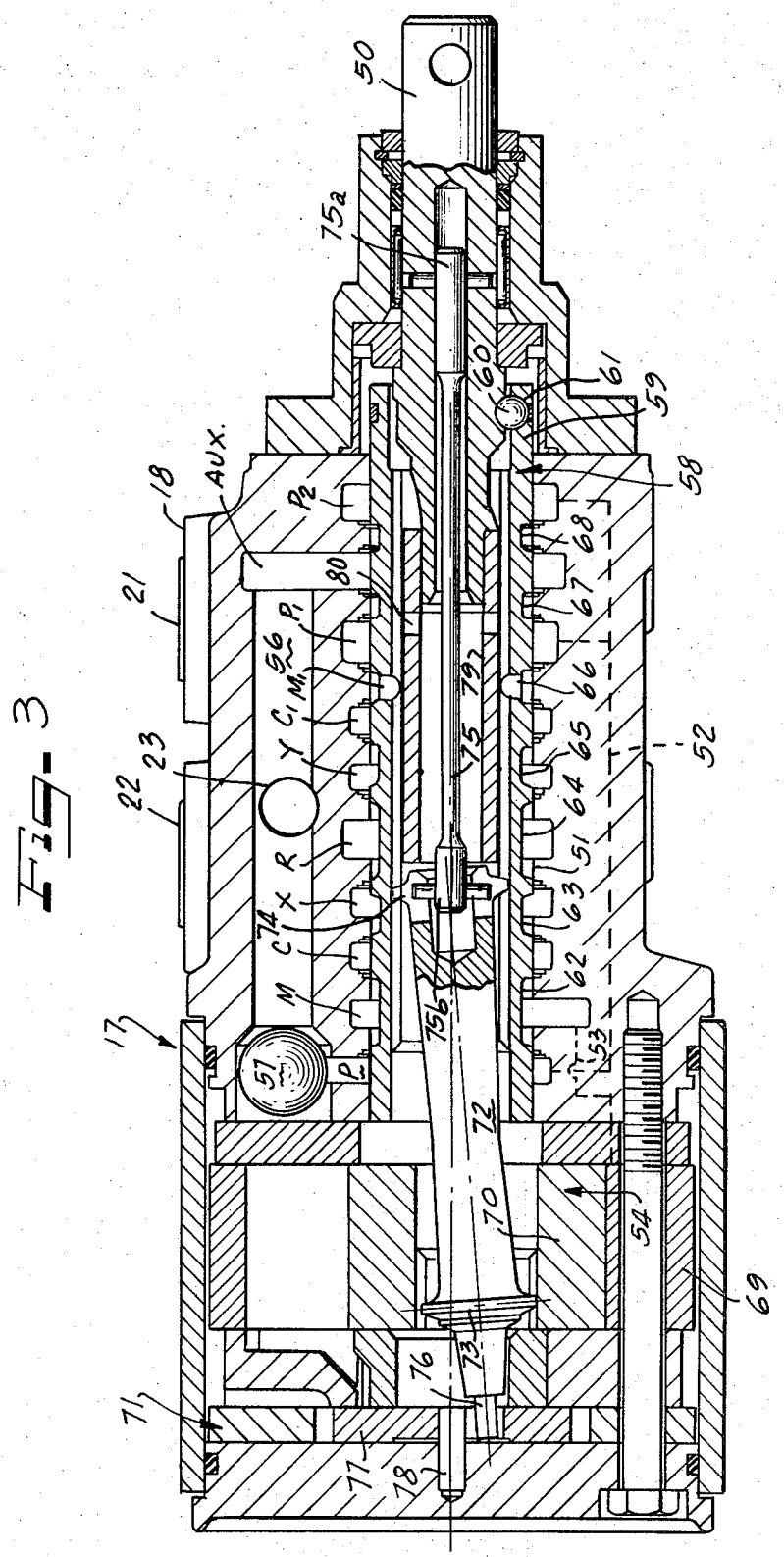

3,834,278

POWER STEERING SYSTEM WITH AUXILIARY POWER CAPABILITY

BACKGROUND OF THE INVENTION

This invention relates generally to the field of vehicular power steering systems and more particularly to a power steering system having a power fluid pump, a hydraulic cylinder for moving the steered wheels of the vehicle and a fluid controller between the pump and the hydraulic cylinder for controlling the flow of pressurized fluid therebetween.

Many vehicles presently being manufactured are equipped with power steering systems. Generally such systems include a power fluid pump which is driven by the engine, a hydraulic cylinder connected to mechanical steering linkage for moving the dirigible wheels and a fluid controller for controlling the flow of fluid between the pump and the hydraulic cylinder. The fluid controller is generally connected to or operated in conjunction with a movement of the steering wheel.

Vehicles which employ power steering systems include both on-the-road and off-the-road vehicles. "On-the-road" vehicles are those which are intended to be driven primarily upon streets, highways and the like and include passenger cars, trucks and buses. "Off-the-road" vehicles are those intended primarily for use other than on the public streets and highways and include farm equipment such as combines and construction equipment such as scrapers.

Some "on-the-road" vehicles and a great number of "off-the-road" vehicles are equipped with hydraulically operated mechanisms or implements such as loading devices, leveling or scraper blades, etc. Much farm equipment which is pulled by or connected to a tractor includes hydraulically operated implements.

In many instances it would be desirable to utilize the pressurized-fluid supply capabilities of the power fluid pump of the power steering system in connection with the operation of the hydraulically operated components or implements. If such arrangement were feasible only a single pump would be required for both the steering system as well as the hydraulic system servicing the implements thereby reducing not only the cost of manufacture but also the space requirements attributable to the pumps and pump drive mechanisms.

This has not generally been done, however, for the following reason. In many situations during operation of a vehicle having a power steering system as well as a hydraulically actuated implement, a steering maneuver must be undertaken at the same time the implement is being actuated. Thus pressurized fluid is required simultaneously by the hydraulic cylinder in the power steering system and the hydraulic cylinder which moves the hydraulically operated implement.

Depending upon the size of the pump, the requirements of the respective hydraulic cylinders and the magnitude of the steering maneuver and the movement of the implement, it may occur that the power steering system is supplied with less pressurized fluid than it would normally receive during a steering maneuver of similar magnitude. In such circumstances the driver of the vehicle will momentarily experience a loss of steering control, at least to some degree. This is due to the failure of the power steering system to respond in the manner expected by the driver, which is in turn caused by fluctuations in the pressure and quantity of fluid available at the steering cylinder.

Of course, in some situations a minor or perhaps even a major loss in steering control is of no particular movement. For example, in many farming operations a high degree of steering control by the driver of a tractor is not necessary and can be tolerated periodically when a hydraulically operated implement is actuated during a steering maneuver. On the other hand, there are situations in which any loss of steering control could represent a hazard.

Rather than depend upon the judgment of the operator in recognizing and reacting to those situations in which simultaneous actuation of the power steering system and power implement would be hazardous, most manufacturers of vehicles provide one power fluid pump for the power steering system and another fluid pump for operating the hydraulic implements. While this ensures optimum steering control it also requires two pumps and two pump drive mechanisms and may also require additional piping in the hydraulic circuitry.

The present invention is addressed to the problem of utilizing only a single pump to service not only the power steering system but auxiliary hydraulic systems while avoiding any loss of steering control in the event that a steering maneuver is undertaken simultaneously with the actuation of an auxiliary hydraulic implement.

SUMMARY OF THE INVENTION

Briefly, the present invention comprises a single power fluid pump, a fluid reservoir connected to the suction side of the pump, a fluid controller connected to the discharge side of the pump, a main hydraulic cylinder for the power steering system and an auxiliary hydraulic cylinder and control valve therefor for operating an implement or the like. The fluid controller controls the flow of fluid from the pump to the hydraulic cylinders, both of which are arranged so that the low pressure ends thereof communicate with the fluid reservoir.

The fluid controller includes an inlet port which is adapted for connection with the discharge side of the pump, a steering cylinder return port which is adapted for connection to the fluid reservoir, a pair of working ports which are adapted for connection to the opposite ends of the steering cylinder and an auxiliary circuit port which is adapted for connection to the auxiliary hydraulic circuit. The latter circuit includes a hydraulic cylinder and a control valve for controlling the flow of fluid to the cylinder.

The fluid controller includes a valve mechanism which operates in the following manner. When in a neutral position the valve mechanism interconnects the inlet port with the port communicating with the auxiliary cylinder. In this respect the valve mechanism may be conveniently referred to as being of the "open center" type, since the fluid is permitted to flow through the valve mechanism in the neutral position thereof.

When the valve mechanism is shifted from its neutral position toward an operating position it connects the inlet port not only to the auxiliary port but also to the appropriate one of the pair of work ports communicating with the main hydraulic cylinder (the steering cylinder) for actuating the power steering system. As the valve mechanism moves toward an operating position, however, it "pinches off" fluid flow to the auxiliary circuit as it increasingly opens the fluid flow path to the steering circuit. This is due to suitable "staging" of the valve mechanism and occurs regardless of the degree of movement of the valve mechanism from its neutral position and regardless of the direction of movement from the neutral position. Consequently, the main hydraulic cylinder and the power steering system always have "priority" over the auxiliary circuit so far as the pressurized fluid being supplied by the power fluid pump is concerned. Consequently, the operator has optimum control over the power steering system regardless of whether the auxiliary circuit is being actuated simultaneously since, in all circumstances, movement of the valving mechanism from its neutral position tends to pinch off flow to the auxiliary circuit and the degree of pinching is proportional to the distance by which the valve mechanism has moved from its neutral position.

It is, therefore, an object of the invention to provide a power steering system utilizing a single power fluid pump which is capable of supplying pressurized fluid to an auxiliary circuit without loss of steering control regardless of whether the auxiliary circuit is actuated during a steering maneuver.

Another object of the invention is to reduce the cost of vehicles equipped with power steering systems as well as auxiliary hydraulic systems for actuating hydraulically operated components, implements and the like.

Another object of the invention is to provide a fluid controller for use in power steering systems which is adapted to control the flow of fluid not only to the main hydraulic cylinder in the power steering system but also to an auxiliary hydraulic cylinder while ensuring that the main hydraulic cylinder always has priority over the auxiliary hydraulic cylinder regardless of whether the two are actuated simultaneously.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWING

FIG. 1 is a generally diagrammatic view of hydraulic circuitry including a power steering circuit and an auxiliary circuit and is constructed in accordance with the principles of the present invention.

FIG. 2 is an elevational view of a fluid controller included in the hydraulic circuitry of FIG. 1.

FIG. 3 is a longitudinal sectional view of the fluid controller shown in FIG. 2.

DESCRIPTION OF THE PREFERRED EMBODIMENT

The hydraulic circuitry shown in FIG. 1 includes a power steering system of the type commonly referred to as a hydrostatic system. A hydrostatic power steering system is one in which the dirigible wheels of the vehicle on which the circuit is mounted are actuatable only by hydraulically developed forces, even under conditions in which the turning force is produced manually rather than by a mechanical power fluid pump. Thus, in a hydrostatic power steering system there is no direct mechanical connection between the steering wheel and the steering shaft and the steered wheels. Hydrostatic power steering systems are most commonly employed in off-the-road vehicles.

The principles of the present invention are sufficiently broad, however, to encompass power steering systems which include a direct mechanical connection between the steering wheel and the steered wheels. Such systems include, for example, integral gear steering systems in which a hydraulic cylinder moves the steered wheels during power operation and the steering shaft itself, by means of a direct mechanical connection, moves the steered wheels during manual operation in situations in which the power fluid pump is inoperative.

Thus, the invention is described herein in association with a hydrostatic power steering system, and it will be understood that the principles of the invention find utility in connection with other power steering systems.

Referring to FIG. 1, the total hydraulic circuitry indicated at reference numeral 10 may be conveniently divided into a power steering circuit 11 and an auxiliary circuit 12. The power steering circuit 11 comprises a power fluid pump 13, the suction side of which is connected to an open fluid reservoir 14 by means of a conduit 16. The power fluid pump 13 is preferably of the positive displacement type and is sized to provide a sufficient quantity of pressurized fluid to properly actuate the power steering system.

The circuit 11 also includes a fluid controller indicated generally at reference numeral 17. The fluid controller 17 includes a housing 18 on which are formed a fluid inlet port 19, a fluid return port 20, a pair of steering cylinder or working ports 21 and 22 and an auxiliary port 23. The fluid inlet port 19 is connected to the discharge side of the pump 13 by means of a conduit 24 and the fluid return port 20 is connected to a fluid reservoir 26 by means of a conduit 27.

Several fluid reservoirs are shown in FIG. 1 but it should be understood that all are open to atmosphere and therefore the operation of the invention does not require a multiplicity of reservoirs. On the contrary, all can be interconnected or combined into a single reservoir. In either event the single reservoir or the multiple reservoir are effectively connected to the suction side of the power fluid pump 13, as is indicated with respect to reservoir 14.

The various components of the hydraulic circuit 10 as well as the interconnecting conduits or piping are constructed to operate at a fluid pressure which does not exceed a predetermined allowable working or operating pressure. If the actual system pressure is substantially exceeded damage to the hydraulic circuit or various components thereof may be damaged. For the reason the hydraulic circuit 10 includes a pressure relief valve 28 which relieves the pressure in the hydraulic circuit 10 in the event it rises above the predetermined operating level. A pressure relief mechanism is commonly employed in power steering systems and the desirability thereof is commonly appreciated by those skilled in the art.

A conduit 29 having a branch conduit 29a is connected to the port 21 and another conduit 30 having a branch conduit 30a is connected to port 22. Conduit 29 is connected to one end of a hydraulic cylinder 31, from which extends a piston rod 32, and conduit 29a is connected to one end of another hydraulic cylinder 33, from which a piston rod 34 extends. Conduits 30 and 30a are connected respectively to the opposite ends of the hydraulic cylinders 31 and 33.

Together the hydraulic cylinders 31 and 33 actuate the dirigible wheels of the vehicle on which the hydraulic circuit 10 is mounted. These two cylinders may together be considered the main hydraulic cylinder or the hydraulic cylinder included within the power steering circuit 11. It is possible, of course, to substitute a single cylinder for the pair of cylinders 31 and 33, in which the branch conduits 29a and 30a would be eliminated.

The auxiliary circuit 12 comprises a hydraulic cylinder 36, from one end of which a piston rod 37 extends. The piston rod 37 may be connected to any suitable hydraulically operated such as a scraper blade, for example, mounted on the front of the vehicle.

Also included in the circuit 12 is a control valve 38 having a housing 39 in which a plurality of ports are formed. One port, indicated schematically at reference numeral 40, is connected to the auxiliary port 23 of the fluid controller 17 by means of a conduit 41. Another port 42 is connected to an open reservoir 43 by means of a conduit 44. As noted hereinabove, the reservoir 43 may be considered to be and in fact may be the reservoir 14. If a separate reservoir 43 is utilized it may be connected to the reservoir 14 by means of a suitable piping arrangement.

Ports 46 and 47 communicate respectively with the opposite ends of the hydraulic cylinder 36 by means of conduits 48 and 49 and it will be appreciated that as pressurized fluid is supplied to the conduit 48, the piston rod 37 will be moved rightwardly as viewed in FIG. 1. On the other hand, as the pressurized fluid is supplied to conduit 49, the piston rod 37 will move leftwardly.

As indicated in the drawing, the control valve 38 may be manually moved between three positions. In the neutral position shown the control valve 38 merely interconnects conduits 41 and 44 to direct the fluid flowing through conduit 41 directly to the fluid reservoir 43.

In one of the two operating positions of the control valve 38, the pressurized fluid is directed from conduit 41 to one end of the hydraulic cylinder 36, whereas in the other operating position the opposite end of the hydraulic cylinder 36 is pressurized. Thus the valve 38 may also be conveniently referred to as an "open center" valve, as will be understood by those skilled in the art.

Referring to FIGS. 2 and 3, an operating shaft 50 is journalled for rotation on the housing 18 of the fluid controller 17. The end of the operating shaft 50 which protrudes from the housing 18 is adapted for connection to a steering wheel either directly or through an extension shaft or the like. Turning the shaft 50 in one direction will result in movement of the steered wheels in one direction, whereas rotation of the operating shaft 50 in the other direction will cause the steered wheels to move in the other direction. As noted hereinabove, there is no direct mechanical connection between the operating shaft 50 and the steered wheels in the embodiment of the invention shown in the drawings.

Also formed in the housing 50 is a cylindrical bore wall 51 in which are formed a series of axially spaced circumferentially continuous grooves identified respectively, from left to right as shown in FIG. 3, by reference characters P, M, C, X, R, Y, $C_1$, $P_1$, AUX and $P_2$.

The foregoing grooves are connected to ports 19–23 in the following manner. Groove P communicates directly with the fluid inlet port 19. Groove R communicates directly with the fluid outlet port 20. Grooves C and $C_1$ are connected respectively to ports 22 and 21 and groove AUX is connected to the auxiliary port 23.

In addition, grooves P, $P_1$ and $P_2$ are interconnected by an internal fluid passageway as shown at reference numeral 52. Another internal passage 53 communicates groove M to a fluid metering section of the fluid controller 17 indicated generally at reference numeral 54.

Groove AUX communicates with the auxiliary port 23 via an internal passage 56, one end of which communicates with the groove P and the fluid inlet port 19. It is noted, however, that a ball check 57 blocks flow from the groove P to the internal passage 56 when the power fluid pump 13 is operating.

A valve spool 58 is carried in the bore 51 for axial and rotational movement. One end 59 of the valve spool 58 is coupled to the operating shaft for limited relative rotation, in response to which, by means of a ball 60 riding in a helical groove 61, the valve spool 58 is shifted axially.

When the valve spool 58 is in a predetermined radial alignment with the operating shaft 50, as shown in FIG. 3, it may be considered as assuming a neutral position. When the operating shaft 50 is rotated in one direction from the aligned position, the valve spool 58 will shift axially in one direction from the neutral position shown. On the other hand, when the operating shaft 50 is rotated in an opposite direction, the valve spool 58 will be shifted axially in an opposite direction from the neutral position shown.

The beforementioned grooves formed in the bore wall are separated by a corresponding series of lands, and another series of grooves indicated at reference numerals 62–68 are formed in the valve spool 58. As the valve spool 58 is shifted axially from the neutral position shown, various ones of the grooves P through $P_2$ formed in the bore wall 51 are spanned by and placed in fluid communication with others of the grooves P through $P_2$.

The fluid metering section 54 comprises a pair of fluid displacement members or gears 69 and 70. These gears are of the so-called gerotor type in which gear 69 surrounds gear 70 and has one more tooth than does gear 70 such that in response to relative rotation between the two gears the axis of the inner gear 70 orbits about the axis of the outer gear 69. A commutator valving mechanism indicated generally at reference numeral 71 serves to direct the fluid into and out of the expanding and contacting pockets between the teeth of the gears 69 and 70 and is operatively connected to the inner gear 70 by means of a wobble shaft 72. One portion 73 of the shaft 72 is connected to the inner gear 70 for joint rotation therewith while another portion 74 is connected to the valve spool 58 for joint rotation therewith. An extension 76 of the shaft 72 rotates a valve member 77 about a shaft 78 during operation of the gears 69 and 70.

The valve member 77 directs pressurized fluid, entering the fluid controller 17 through the fluid inlet port 19, to the expanding fluid pockets formed between the teeth of the gears 69 and 70. High pressure fluid is communicated to the valve member 77 by fluid passages including the passage 53.

The valve member 77 also directs the fluid from the contacting fluid pockets formed between the teeth of the gear members 69 and 70 and through passages formed in the fluid controller 17 including a bore 79 formed in the valve spool 58. Although the fluid displacement members illustrated are of the gerotor type, other metering means may be conveniently utilized. Some power steering systems, such as integral gear systems, do not utilize any fluid metering means whatsoever because of the direct mechanical connection between the steering wheel and the steered wheels. A torsion rod 75 is connected fast at one end 75a to the operating shaft 50, whereas an opposite end 75b is connected fast to the wobble shaft 72. The torsion rod 75 comprises a mechanical biasing member for constantly biasing the valve spool 58 to a neutral position vis-a-vis the operating shaft 50.

In many respects the fluid controller 17 is similar to the controller 15 illustrated and described in Raymon L. Goff et al. U.S. Pat. No. 3,452,543, which is incorporated by reference herein. The patent discloses additional features of the fluid displacement section as well as other known features of the fluid controller 17 which will not be discussed in detail herein in the interest of brevity.

The operation of the fluid controller 17 may be briefly described as follows. In the neutral position of the valve spool 58 shown in FIG. 3, high pressure fluid is directed from the fluid inlet port 19 to the groove P, thence through passage 52 to grooves $P_1$ and $P_2$. From the latter grooves, the fluid flows through grooves 67 and 68 of the valve spool 58 to the groove AUX, and thence to the auxiliary port 23.

Assume now that the shaft 50 is turned in a rightward or clockwise direction as it is viewed from the right-hand end thereof shown in FIG. 3. This will cause the valve spool 58 to shift leftwardly.

After the operating shaft 50 has been rotated sufficiently, the valve spool 58 will be shifted far enough leftwardly whereby groove M will communicate with groove P through the groove 62 formed in the valve spool 58. From groove M, the high pressure fluid flows through passage 53 to the valve 17, thence to the expanding fluid pockets between the teeth of the gears 69 and 70 and thence back to the valve member 77 to the interior bore 79 of the valve spool 58. From there the fluid flows through a radial passage 80 formed in the valve spool 58 and thence through groove 66 to groove $C_1$, from which it flows to the cylinder or working port 22 and thence to the steering cylinders 31 and 33.

The fluid returning to cylinder port 22 from the steering cylinders 31 and 33 enters groove C, from which it flows to groove X through groove 63 and thence to groove R, from which it flows to the fluid outlet or return port 20.

As the pressurized fluid is communicated with gear members 69 and 70, the internal gear or rotor 70 is rotated in the same direction as the shaft 50 and tends to rotate the valve spool 58 by means of the wobble shaft 72 in a "follow-up" direction of rotation, (i.e., back to the neutral position of the valve spool 58 vis-a-vis the operating shaft 50) as will be understood by those skilled in the art.

Rotation of the operating shaft 50 in a counterclockwise direction has the effect of shifting the valve spool 58 rightwardly as viewed in FIG. 3 from the neutral position shown. After the operating shaft 50 has rotated relative to the spool 58 sufficiently, groove $P_1$ communicates with groove 66, thereby supplying pressurized fluid through the passage 80 into the interior 79 of the valve spool 58. From there the pressurized fluid flows through the valve element 77 to the expanding pockets between the teeth of the gears 69 and 70. The fluid flowing from between the contracting fluid pockets is delivered by the valve element 77 to the passage 53, from which it flows through groove M and groove 62 to the cylinder groove C. From groove C the fluid flows to the working port 21 to actuate steering cylinders 31 and 33. The low pressure fluid returning from the cylinders 31 and 33 via the cylinder port 22 flows through groove $C_1$ into groove 65, from which it flows into grooves Y and 64 to the return groove R, which communicates with the fluid return port 20.

It will be appreciated by those skilled in the art that, in situations where the power fluid pump 13 is inoperative, the fluid controller 17 may be utilized as a fluid hand pump for generating pressurized fluid to actuate the hydraulic cylinders 31 and 33. Thus while there is no direct mechanical connection between the steered wheels and the steering wheel, there is a hydraulic connection, even when the power fluid pump 13 is inoperative.

In the neutral position of the valve spool 58, the groove AUX is in fluid communication with grooves $P_1$ and $P_2$, and therefore openly communicates with the auxiliary port 23. Thus fluid simply flows through the controller 17 from the inlet port 19 to the auxiliary port 23. In the circumstances, the fluid flowing from the auxiliary port 23 to the auxiliary circuit 12 is available for operating the auxiliary hydraulic cylinder 36 upon actuation of the valve 38.

On the other hand, due to the "staging" or construction and arrangement of the axially spaced grooves P through $P_2$ formed in the bore wall 51 (and the lands located therebetween) and the axially spaced grooves 62–68 formed in the periphery of the valve spool 58 (and the lands located therebetween) the orifices formed by the interacting faces of the grooves $P_1$, AUX and $P_2$, through which fluid flows to the auxiliary port 23 are gradually "pinched off" or reduced in size as the valve spool 58 moves in either direction from its neutral position (at which all of the fluid flowing through the controller 17 flows through the auxiliary port 23) to an operating position (at which at least some of the fluid flowing through the controller 17 is directed to the steering cylinders 31 and 33 to effect turning of the steered wheels). As a matter of fact, if the valve spool 58 is moved far enough from its neutral position toward an operating position, the orifices between the grooves P, AUX and $P_2$ are completely closed off, thus eliminating all fluid flow to the auxiliary circuit 12 and directing all of the fluid flowing through the controller 17 to one side or the other of the steering cylinders 31 and 33, depending upon the direction of rotation of the operating shaft 50 and the direction in which the valve spool 58 is shifted axially from its neutral position.

In the circumstances, in the neutral position of the valve spool 58 all of the fluid being pumped by the power fluid pump 13 is available for operating hydraulic implements. During a steering maneuver, however, the valve spool 58 will be moved from its neutral position to an operating position to turn the steered wheels in accordance with the desires of the operator. At this occurs, the orifices through which fluid flows to the auxiliary port 23 is pinched off by an amount which depends upon the distance which the valve spool 58 is moved from its neutral position. At the same time the orifices directing fluid to auxiliary port 23 are being reduced in size, the orifices formed by the remaining grooves through which fluid flows to and from the steering cylinders 31 and 33 are first being opened and then being increased in size. The distance which the valve spool 58 must move in order to effect movement of the steered wheels depends, of course, upon the resistance to turn to which the steered wheels are subjected. On dry pavement, particularly with the vehicle in motion, it may only be necessary to "crack" the orifices formed between the interacting faces of the appropriate grooves P through $P_2$ and 62–68 to cause a turning movement of the steered wheels. This suggests, of course, that the fluid can be substantially reduced in pressure as it flows past these orifices and still have sufficient pressure at the steering cylinders 31 and 33 to overcome the steering force requirements.

If, however, the vehicle is on dirt or sand, or involved in a parking maneuver or the like, the resistance to turn is greatly increased, and the valve spool 58 may have to shift a greater distance to effect movement of the steered wheels.

Regardless of the resistance to turn, however, and regardless of whether the auxiliary cylinder 36 is operating or not, and if it is operating, regardless of the pressure of the fluid in hydraulic circuit 12, the pressure fluid being pumped by the fluid pump 13, indeed, all the pressure fluid, if need be, is constantly available to the operator of the vehicle to assist in turning the steered wheels.

This situation obtains supply because the valve spool 58 always tends to pinch off or starve the auxiliary circuit 12 the further it moves from its neutral position during a steering maneuver and can, in fact, completely shut off the auxiliary circuit 12 if the steering requirements so dictate.

With respect to the embodiment of the invention illustrated herein, the grooves 67, AUX and 68 are so constructed and arranged that the inlet port 19 communicates with auxiliary port 23 not only in the neutral position of the valve spool 58, but also until the spool 58 shifts about 0.40 inch from its neutral position to an operating position. On the other hand, communication between the inlet port 19 and the working ports 21 and 22 is blocked until the valve spool 58 moves approximately 0.10 inch from its neutral position. The function of the drive spool 58 in communicating and in blocking communication of the inlet port 19 and the auxiliary port 23 as well as the working ports 21 and 22 as a function of the distance which the valve spool 58 is shifted from its neutral position may be conveniently referred to as the "staging" of the valve spool 58.

It is appreciated that the orifices formed by grooves P through $P_2$ in the bore wall 51 and grooves 62 through 68 in the valve spool 58 provide restricted flow paths through which the fluid flows from the inlet port 19 to working ports 21 and 22 and auxiliary port 23. The degree of the restriction to flow provided by the orifices depends, of course, on the distance which the valve spool 58 has shifted in either direction from its neutral position to its operating position.

As a result of such staging, the pressurized fluid flowing from the pump 13 to the fluid inlet port 19 will always satisfy the demands of the power steering circuit 11, regardless of whether the auxiliary hydraulic circuit 12 is actuated. It is only the excess fluid which is not required by the steering circuit 11 that will flow to the auxiliary circuit 12, assuming that the valve spool 58 is not required to shift so greatly by virtue of the steering maneuver to pinch off all flow to the auxiliary circuit.

Depending upon the resistance to turning of the steered wheels, of course, the operating shaft may have to be turned to a greater or lesser degree to begin to move the steered wheels. Regardless of the resistance to turning and the amount of rotation of the operating shaft required, however, the fluid pressure demands of the steering circuit 11 will always be met before those of the hydraulic circuit 12. Furthermore, if during a steering maneuver, and while the auxiliary hydraulic circuit 12 is also actuated, the resistance to turning of the steered wheels increases, additional rotation of the operating shaft 50 may be required to cause a further turning movement of the steered wheels, but the demands of the power steering circuit 11 can in fact be met by such additional rotation of shaft 50, and therefore always have priority over the demands of the auxiliary hydraulic circuit 12.

As a result, both circuits 11 and 12 can be connected to a single power fluid pump 13 without any risk of losing steering control in the event that both circuits are actuated simultaneously. Full control over steering always obtains and is never diminished at the expense of actuating of the auxiliary hydraulic circuit 12. The necessity of a second fluid pump and the cost and space requirements attendant thereto are eliminated.

It is also noted that since the fluid which exhausts from the auxiliary hydraulic cylinder 36 is dumped into the open reservoir 43 it is impossible for pressure buildup in the auxiliary cylinder 36 (due to shock load or the like) to have any effect on the operation of the steering cylinders 31 and 33. Since all three of the cylinders 31, 33 and 36 effectively exhaust to atmospheric pressure, the possibility of any disruption of the operation of the power steering circuit as a consequence of instantaneous and excessive pressure builds up in the auxiliary circuit is eliminated.

Although minor modifications might be suggested by those versed in the art, it should be understood that we wish to embody within the scope of the patent warranted hereon all such modifications as reasonably come within the scope of our contribution to the art.

We claim:

1. A fluid controller comprising a housing having a fluid inlet port, a pair of working ports, a return port and an auxiliary port formed therein, and valve means for selectively interconnecting said ports including a valve element movable in one direction from a neutral position to an operating position and in another direction from said neutral position to another operating position, said valve means, in the neutral position of said valve element, establishing a flow path between said inlet port and said auxiliary port and, during movement of said valve element toward either of said operating positions of said valve element maintaining said flow path between said inlet port and said auxiliary port and establishing a restricted flow path between said inlet port and one of said working ports and establishing a flow path between the other of said working ports and said return port, said valve means being effective, as said valve element moves progressively from said neutral position toward one of said working ports, to progressively increase the restriction between said inlet port and said auxiliary port and to progressively decrease the restriction between the inlet port and the one of said working ports to which it is connected.

2. A fluid controller as defined in claim 1 and including an operating shaft journalled for rotation on said housing, and means interconnecting said operating shaft and said valve element for moving said valve element from said neutral position to one of said operating positions as said operating shaft is rotated in one direction and for moving said valve element from said neutral position to the other of said operating positions as said operating shaft is rotated in the opposite direction.

3. The fluid controller as defined in claim 1 in which said valve element is axially arranged and shifts axially as it moves from said neutral position toward either of said operating positions.

4. The fluid controller of claim 1 wherein the valve element completely blocks fluid flow from said inlet port to said auxiliary port at each of the operating positions thereof and provides an unrestricted flow path to the respective one of said working ports while providing an unrestricted flow path from the other of said working ports to said return port.

5. A fluid controller comprising a housing, said housing including a fluid inlet, first and second working ports, a fluid return port and an auxiliary port, a valve movably located within said housing and having a neutral position communicating the inlet to the auxiliary port and blocking the inlet from the first and second working ports, said valve having first and second operative positions communicating said inlet with the first and second working ports respectively and said valve blocking communication with the second and first working ports at the first and second operative positions of the valve respectively and progressively restricting communication from the inlet to the auxiliary port and progressively increasing communication between the inlet and the first or second working ports and establishing communication between the other of said working ports and said return port as said valve is moved from said neutral position; spring means normally biasing said valve to the neutral position, and a valve actuator operatively associated with said valve for moving said valve from the neutral position to the operative positions.

* * * * *